W. S. KNOX.
STOCK RELEASING DEVICE.
APPLICATION FILED FEB. 20, 1912.
1,092,723.
Patented Apr. 7, 1914.
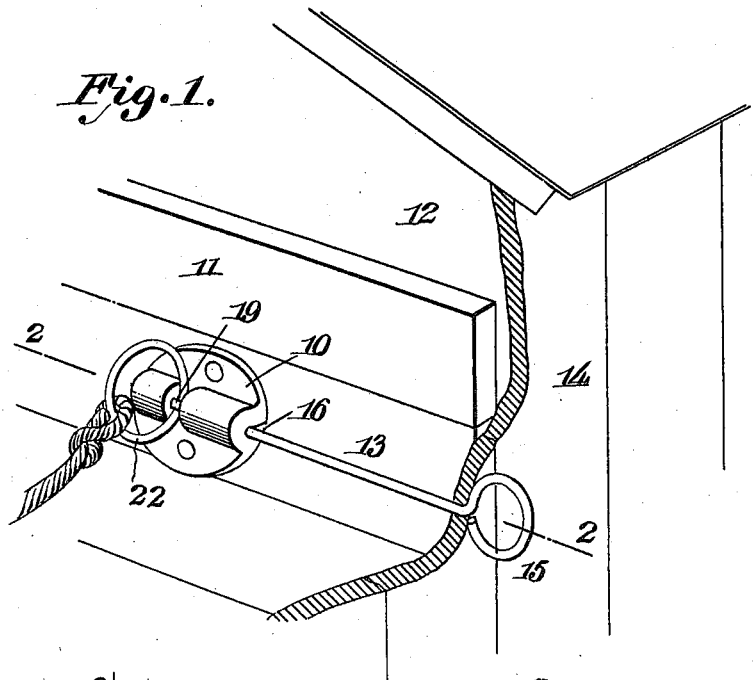
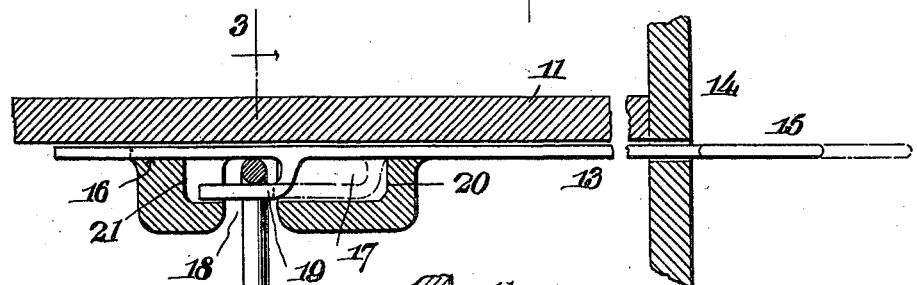
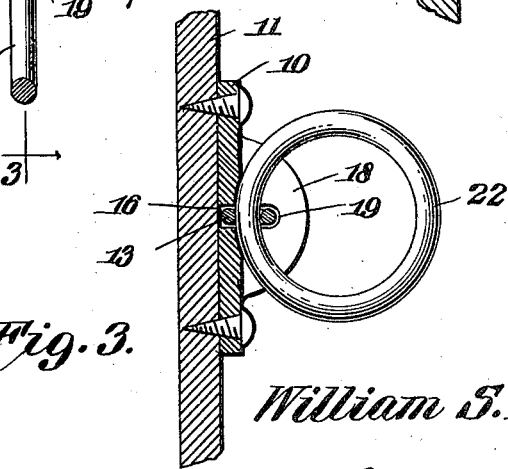
Inventor
William S. Knox.
Witnesses
D. B. Galt.
F. H. Hoster.
By Victor J. Evans
Attorney

UNITED STATES PATENT OFFICE.

WILLIAM S. KNOX, OF BRIDGEPORT, ILLINOIS.

STOCK-RELEASING DEVICE.

1,092,723.   Specification of Letters Patent.   Patented Apr. 7, 1914.

Application filed February 20, 1912. Serial No. 678,776.

*To all whom it may concern:*

Be it known that I, WILLIAM S. KNOX, a citizen of the United States, residing at Bridgeport, in the county of Lawrence and State of Illinois, have invented new and useful Improvements in Stock-Releasing Devices, of which the following is a specification.

An object of the invention is to provide a device, for use in connection with stables and buildings where live stock is kept, to quickly release the live stock in case of fire or the like.

My invention embodies among other features, a device for securing the live stock within a stall, the said device being operable exteriorly of the building to release the animal in case of fire, thus obviating the necessity of the operator going inside the stable or shed and exposing himself to the dangers of the fire.

For the purpose mentioned, use is made of a locking plate, preferably secured rigidly to a side of the stall in which the animal is kept, a releasing rod being mounted to extend from the exterior of the shed, into the stall and slidable in the locking plate, the said releasing rod being provided with a locking bar adapted to engage a ring having the usual tie rope secured thereto, to retain the said ring in locked engagement with the locking bar, the said ring being disengageable from the locking bar when the releasing rod is pulled outwardly by means of a handle formed on the releasing rod exteriorly of the shed.

Reference is to be had to the accompanying drawings constituting a part of this specification, in which similar characters of reference denote corresponding parts in all the views, and in which—

Figure 1 is a fragmentary perspective view of a shed, showing a stall therein, having my device applied thereto. Fig. 2 is a longitudinal sectional view taken on the line 2—2 in Fig. 1, the dotted line showing the locking bar in unlocked position. Fig. 3 is a horizontal sectional view taken on the line 3—3 in Fig. 2.

Referring more particularly to the views, I provide a plate 10 for rigid connection with one side of a stall 11 arranged within the shed 12. A releasing rod 13 has an end thereof slidably extended through a side 14 of the shed 12 and the mentioned end is provided with an integral handle 15, the said handle being arranged exteriorly of the shed as shown in Fig. 1. The plate 10 is provided with grooves 16 to slidably receive the other end of the rod 13 and the said plate is provided with a recess 17 and a cut-away portion 18, a locking bar 19 being formed on the releasing rod 13 and offset therefrom with the body of the said locking bar extending parallel to the rod 13, the free end of the locking bar being spaced from the releasing rod. As mentioned heretofore, the rod 13 is slidable within the recess 17 of the plate 10 and when the releasing rod is in its innermost position, the locking bar 19 will extend across the cut-away portion 18 of the plate as shown conveniently in Fig. 2, inner sides 20 and 21 of the plate 10 being adapted to limit the sliding movement of the locking bar 19, thus also limiting the sliding movement of the rod 13.

When the rod 13 is in its outermost position, the inner end of the locking bar 19 will abut against the inner side 20 of the plate 10 and by inserting a ring 22 in the cut-out portion 18 of the plate and then moving the rod 13 inwardly, the locking bar 19 passing across the cut-away portion 18 of the plate 10 will engage the inner periphery of the ring so that the ring will be retained in locked engagement with the locking bar and will be positioned between the locking bar and the releasing rod, the inner end of the locking bar being adapted to abut against the inner side 21, thus locking the ring 22 with the locking bar, the said ring, however, being movable to swing relatively to the locking bar as will be readily understood. The usual tie rope is secured to the ring 22 and has an end thereof preferably provided with a snaffle hook for engagement with a suitable harness on the animal, thus retaining the animal in tied position in the stall. Should a fire occur in the shed 12, the operator on the exterior of the shed, simply grasps the handle 15 and pulling outwardly thereon releases the ring 22 from engagement with the locking bar 19, thus releasing the animal and permitting the same to move out of the stall of the shed 12.

With a device of this kind the operator need not go into the shed to release the animals and the device can be readily operated from the outside, thus obviating the necessity of the operator exposing himself to the dangers of the fire. When a number of the devices described are arranged in a shed in horizontal alinement, with one device for each stall, a longer bar or lever can be connected with the handles of each of the devices and by simply pulling outwardly on the said lever, all of the devices can be operated simultaneously as will be readily understood.

I claim:—

In a device of the class described, the combination with a plate for rigid connection with the side of a wall and provided with a longitudinal groove and a cut away portion forming a transverse opening in the plate, a releasing rod operable in the said groove, with the said groove constituting a passage for the rod when the plate is attached to the wall, and a locking bar formed integrally with the releasing rod and offset therefrom to extend parallel thereto, the said locking bar lying wholly within the plate and having its free end spaced from the releasing rod to project through the said transverse opening in the plate for locking a ring thereto, the sliding movement of the releasing rod being limited by the engagement of either end of the locking bar with an inner face of the said plate.

In testimony whereof I affix my signature in presence of two witnesses.

WILLIAM S. KNOX.

Witnesses:
 WM. PATTON,
 J. SMITH.

---

Copies of this patent may be obtained for five cents each, by addressing the "Commissioner of Patents, Washington, D. C."